(12) United States Patent
Kasazumi et al.

(10) Patent No.: US 10,571,701 B2
(45) Date of Patent: *Feb. 25, 2020

(54) DISPLAY DEVICE

(71) Applicant: Panasonic Intellectual Property Management Co., Ltd., Osaka (JP)

(72) Inventors: Ken'ichi Kasazumi, Osaka (JP); Toshiya Mori, Osaka (JP); Kosuke Kubota, Osaka (JP); Masahito Ogata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/068,393

(22) PCT Filed: Jan. 10, 2017

(86) PCT No.: PCT/JP2017/000379
§ 371 (c)(1),
(2) Date: Jul. 6, 2018

(87) PCT Pub. No.: WO2017/126352
PCT Pub. Date: Jul. 27, 2017

(65) Prior Publication Data
US 2019/0018250 A1 Jan. 17, 2019

(30) Foreign Application Priority Data
Jan. 20, 2016 (JP) .................................. 2016-009270

(51) Int. Cl.
*G09G 5/00* (2006.01)
*G02B 27/01* (2006.01)
(Continued)

(52) U.S. Cl.
CPC .......... *G02B 27/0179* (2013.01); *B60K 35/00* (2013.01); *G02B 27/0101* (2013.01);
(Continued)

(58) Field of Classification Search
USPC ........................................................ 345/633
See application file for complete search history.

(56) References Cited

U.S. PATENT DOCUMENTS 9,449,518 B2 * 9/2016 Mochizuki ............. G08G 1/165
2016/0217625 A1 * 7/2016 Oba ....................... G06T 3/4038

FOREIGN PATENT DOCUMENTS

| JP | 2006-118963 | 5/2006 |
| JP | 2007-030673 | 2/2007 |
| JP | 2015-219782 | 12/2015 |

OTHER PUBLICATIONS

International Search Report of PCT application No. PCT/JP2017/000379 dated Mar. 28, 2017.

* cited by examiner

*Primary Examiner* — Gordon G Liu
(74) *Attorney, Agent, or Firm* — Greenblum & Bernstein, P.L.C.

(57) ABSTRACT

Provided is a display device that allows a distance from a display medium to an object ahead to be easily ascertained. The display device includes a display unit that projects a light beam onto a windshield so as to be reflected from the windshield such that a virtual image is displayed in a space further than the windshield in the depth direction, and a controller that controls the display unit so that a reference pattern to be superimposed on a pedestrian present in the space is displayed so as to correspond to the position of the pedestrian.

5 Claims, 15 Drawing Sheets

(51) Int. Cl.
*B60K 35/00* (2006.01)
*G09G 3/02* (2006.01)
*G09G 5/377* (2006.01)
*G01C 21/36* (2006.01)

(52) U.S. Cl.
CPC ............... *G09G 3/02* (2013.01); *G09G 5/377* (2013.01); *B60K 2370/1529* (2019.05); *B60K 2370/177* (2019.05); *B60K 2370/193* (2019.05); *B60K 2370/334* (2019.05); *G01C 21/3632* (2013.01); *G02B 2027/0141* (2013.01); *G02B 2027/0185* (2013.01); *G09G 2380/10* (2013.01)

DISPLAY DEVICE

This application is a U.S. national stage application of the PCT International Application No. PCT/JP2017/000379 filed on Jan. 10, 2017 which claims the benefit of foreign priority of Japanese patent application No. 2016-009270 filed on Jan. 20, 2016, the contents all of which are incorporated herein by reference.

TECHNICAL FIELD

The present disclosure relates to a display device for displaying an image.

BACKGROUND ART

As a display device for displaying an image, a vehicular head-up display (HUD) has been known, for example (refer to PTL 1, for example). The head-up display employs so-called augmented reality (AR), and displays a virtual image of an image, which is formed on a screen, in a space in front of a windshield of a vehicle in a two-dimensional (2D) manner. With this configuration, a driver can view information about driving (for example, car navigation information) superimposed on a scene in front of the windshield.

CITATION LIST

Patent Literature

PTL 1: Unexamined Japanese Patent Publication No. 2006-118963

SUMMARY OF THE INVENTION

In the conventional display device described above, an image (marker) indicating the presence of a pedestrian in front of the vehicle is displayed superimposed on the pedestrian. However, there is a problem in which the driver cannot easily ascertain the distance from the windshield to the pedestrian in a depth direction (that is, in a travel direction of the vehicle when viewed from the driver) just by the display of such an image.

In view of this, the present disclosure provides a display device that enables a driver to easily ascertain a distance from a display medium to an object ahead.

A display device according to one aspect of the present disclosure includes: a display unit that projects a light beam onto a display medium so as to be reflected from the display medium and that displays a virtual image in a space further than the display medium in a depth direction; and a controller that controls the display unit so that a reference pattern to be superimposed on a subject present in the space is displayed as the virtual image so as to correspond to the position of the subject.

It should be noted that those comprehensive, specific aspects may be implemented by a system, a method, an integrated circuit, a computer program, or a computer-readable recording medium such as a CD-ROM, or may be implemented by any combination of the system, the method, the integrated circuit, the computer program, and the recording medium.

According to the display device in the invention (present invention) of the present disclosure, a distance from a display medium to an object ahead can be easily ascertained.

DESCRIPTION OF EMBODIMENT

Figure 1:
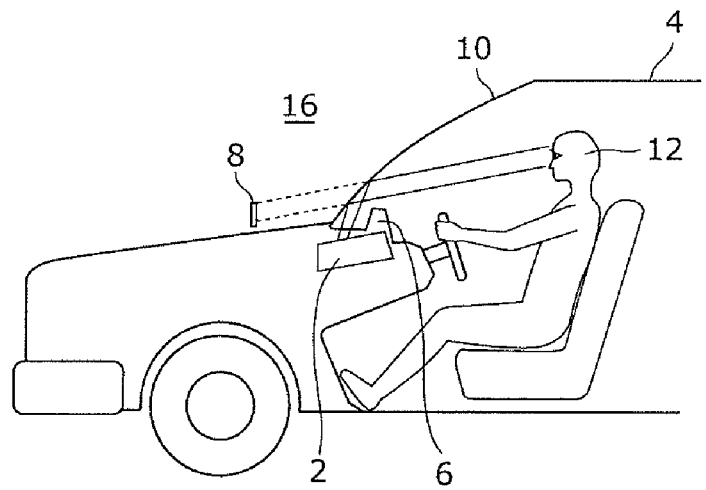
FIG. 1 is a view illustrating a usage example of a display device according to an exemplary embodiment.

To address the foregoing problem, a display device according to one aspect of the present disclosure includes: a display unit that projects a light beam onto a display medium so as to be reflected from the display medium and that displays a virtual image in a space further than the display medium in a depth direction; and a controller that controls the display unit so that a reference pattern to be superimposed on a subject present in the space is displayed as the virtual image so as to correspond to the position of the subject.

According to this aspect, the reference pattern to be superimposed on the subject present in the space is displayed so as to correspond to the position of the subject, whereby, when a marker or the like indicating an object in front of the display medium is superimposed on the reference pattern, the distance from the display medium to the object in front of the display medium can be easily ascertained based on the reference pattern.

For example, the display medium may be a vehicular windshield, and the space may be a space in front of the vehicular windshield.

According to this aspect, the display device can be used as a vehicular head-up display.

For example, the subject may be a pedestrian, the reference pattern may be a grid pattern superimposed on the pedestrian, and the controller may be configured to display a pedestrian image superimposed on the pedestrian as the virtual image such that the pedestrian image is superimposed on the grid pattern, and to display a part of the grid pattern corresponding to the position of the pedestrian image in a highlighted manner.

According to this aspect, the pedestrian image superimposed on the pedestrian is displayed superimposed on the grid pattern, and a part of the grid pattern corresponding to the position of the pedestrian image is displayed in a highlighted manner, whereby a distance from the display medium to the pedestrian can be easily ascertained.

For example, the subject may also be a vehicle, the reference pattern may be a grid pattern superimposed on the vehicle, and the controller may be configured to further display a vehicle image superimposed on the vehicle as the virtual image such that the vehicle image is superimposed on the grid pattern, and to display a part of the grid pattern corresponding to the position of the vehicle image in a highlighted manner.

According to this aspect, the vehicle image superimposed on the vehicle (preceding vehicle) is displayed superimposed on the grid pattern, and a part of the grid pattern corresponding to the position of the vehicle image is displayed in a highlighted manner, whereby a distance from the display medium to the vehicle can be easily ascertained.

For example, when the position of the pedestrian is not superimposed on the grid pattern, the controller may display the pedestrian image so as to be superimposed on a predetermined area in the grid pattern, and display a part of the grid pattern corresponding to the position of the pedestrian image in a highlighted manner.

According to this aspect, even when the position of the pedestrian is not superimposed on the grid pattern, a driver can easily ascertain the position of the pedestrian by viewing the pedestrian image and the grid pattern.

For example, the subject may be a guard rail, and the reference pattern may include a guard rail image superimposed on the guard rail.

According to this aspect, the reference pattern includes the guard rail image superimposed on the guard rail, whereby the distance from the display medium to an object (for example, pedestrian) in front of the display medium can be easily ascertained based on the guard rail image.

For example, the subject may be a traffic lane line, and the reference pattern may include a traffic lane line image superimposed on the traffic lane line image.

According to this aspect, the reference pattern includes the traffic lane line image superimposed on the traffic lane line, whereby the distance from the display medium to an object (for example, pedestrian) in front of the display medium can be easily ascertained based on the traffic lane line image.

It should be noted that those comprehensive, specific aspects may be implemented by a system, a method, an integrated circuit, a computer program, or a computer-readable recording medium such as a CD-ROM, or may be implemented by any combination of the system, the method, the integrated circuit, the computer program, and the recording medium.

Hereinafter, an exemplary embodiment will specifically be described with reference to the drawings.

Note that the following exemplary embodiment provides comprehensive, specific examples of the present disclosure. Numerical values, shapes, materials, constituent elements, arrangement positions and connection modes of the constituent elements, steps, and order of the steps, for example, illustrated in the following exemplary embodiment are merely examples, and therefore are not intended to limit the present invention. Furthermore, among constituent elements in the following exemplary embodiment, constituent elements not recited in the independent claim indicating the broadest concept are described as optional constituent elements.

(Exemplary Embodiment)

[1. Schematic Configuration of Display Device]

Figure 2:
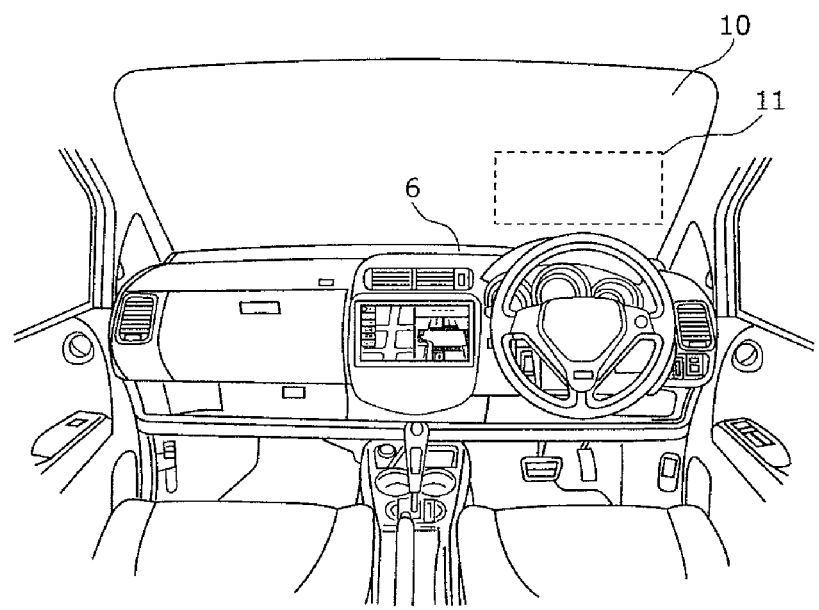
FIG. 2 is a view illustrating an area of an image displayed by the display device according to the exemplary embodiment.
Figure 3:
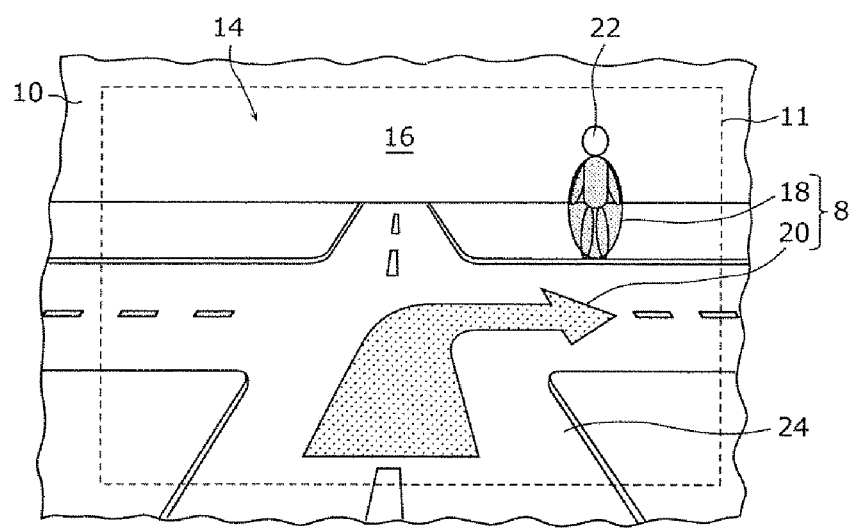
FIG. 3 is a view illustrating an example of the image displayed by the display device according to the exemplary embodiment.

First, a schematic configuration of display device 2 according to an exemplary embodiment will now be described herein with reference to FIGS. 1 to 3. FIG. 1 is a view illustrating a usage example of display device 2 according to the exemplary embodiment. FIG. 2 is a view illustrating area 11 of image 8 displayed by display device 2 according to the exemplary embodiment. FIG. 3 is a view illustrating an example of image 8 displayed by display device 2 according to the exemplary embodiment.

As illustrated in FIG. 1, display device 2 according to the exemplary embodiment is, for example, a vehicular head-up display, and is disposed in dashboard 6 of vehicle 4 (an example of a vehicle).

As illustrated in FIGS. 1 and 2, display device 2 projects a laser light beam (an example of a light beam) for displaying image 8 that is a virtual image toward, for example, area 11 that locates at a lower part in windshield 10 (an example of a display medium) and is close to a driver seat in vehicle 4. With this, the laser light beam is reflected by windshield 10 toward driver 12. Therefore, as illustrated in FIG. 3, driver 12 can view image 8 that is the virtual image superimposed on scene 14 in front of windshield 10. In other words, display device 2 displays (projects) image 8 that is the virtual image in space 16 in front of windshield 10 in a three-dimensional (3D) manner.

In an example illustrated in FIG. 3, image 8 displayed by display device 2 includes vertical image 18 and depth image 20. Vertical image 18 is a virtual image displayed in a vertical direction (up-and-down direction in FIG. 1) in space 16 in front of windshield 10. Vertical image 18 is, for example, a marker having a substantially elliptical shape that is vertically long, and is displayed superimposed on pedestrian 22 present in front of vehicle 4. This configuration allows driver 12 to easily notice the presence of pedestrian 22.

Meanwhile, depth image 20 is a virtual image displayed in a depth direction (right-and-left direction in FIG. 1 and the direction perpendicular to the sheet surface of FIG. 3) that is a direction intersecting the vertical direction in space 16 in front of windshield 10. Depth image 20 is, for example, an arrow for guiding a traveling route to a destination (an arrow for instructing to turn right at an intersection, in an example in FIG. 3), and is displayed superimposed on road 24 present in front of vehicle 4. This configuration allows driver 12 to easily find the traveling route to the destination.

[2. Specific Configuration of Display Device]

Figure 4:
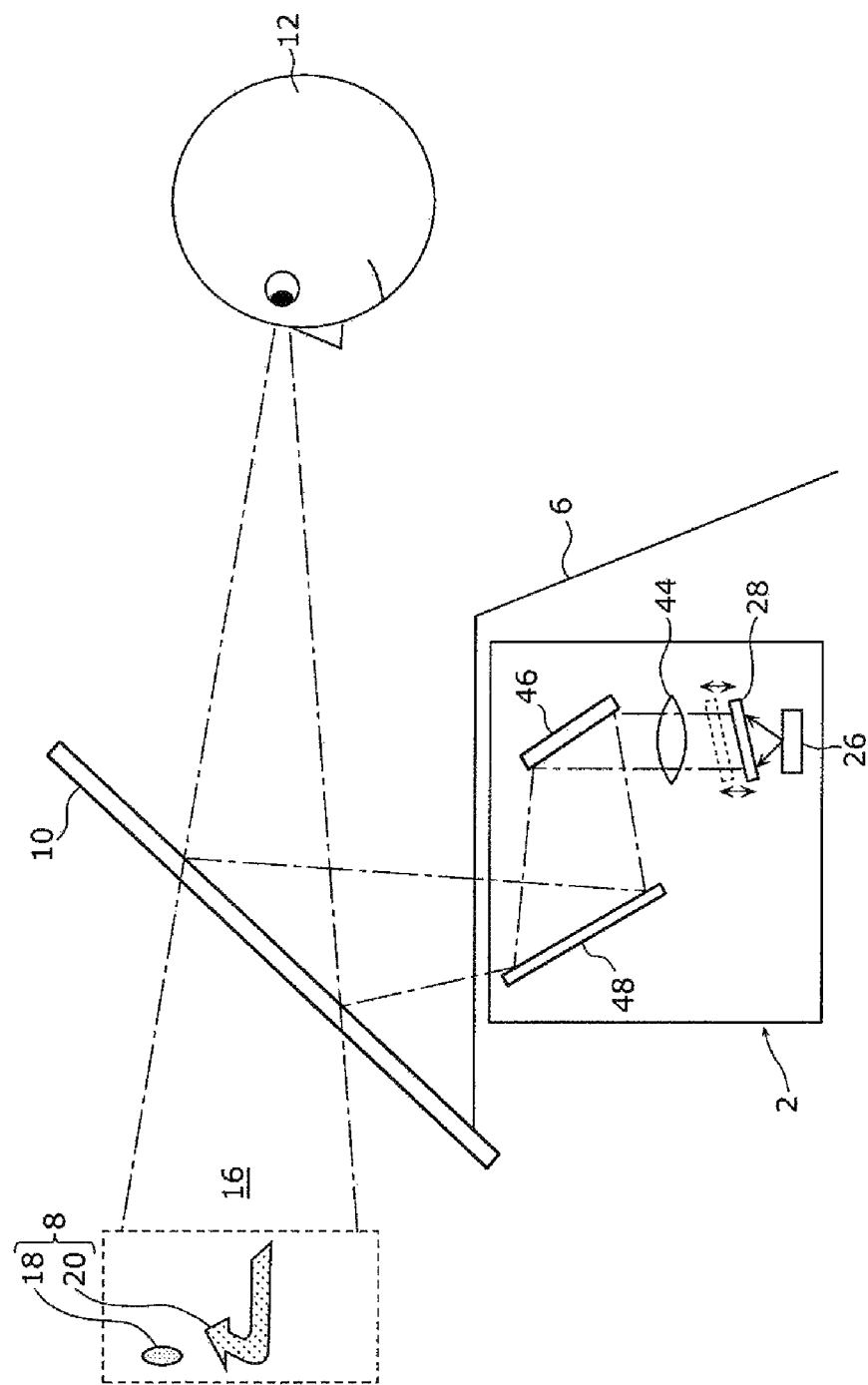
FIG. 4 is a view illustrating a configuration of the display device according to the exemplary embodiment.
Figure 5:
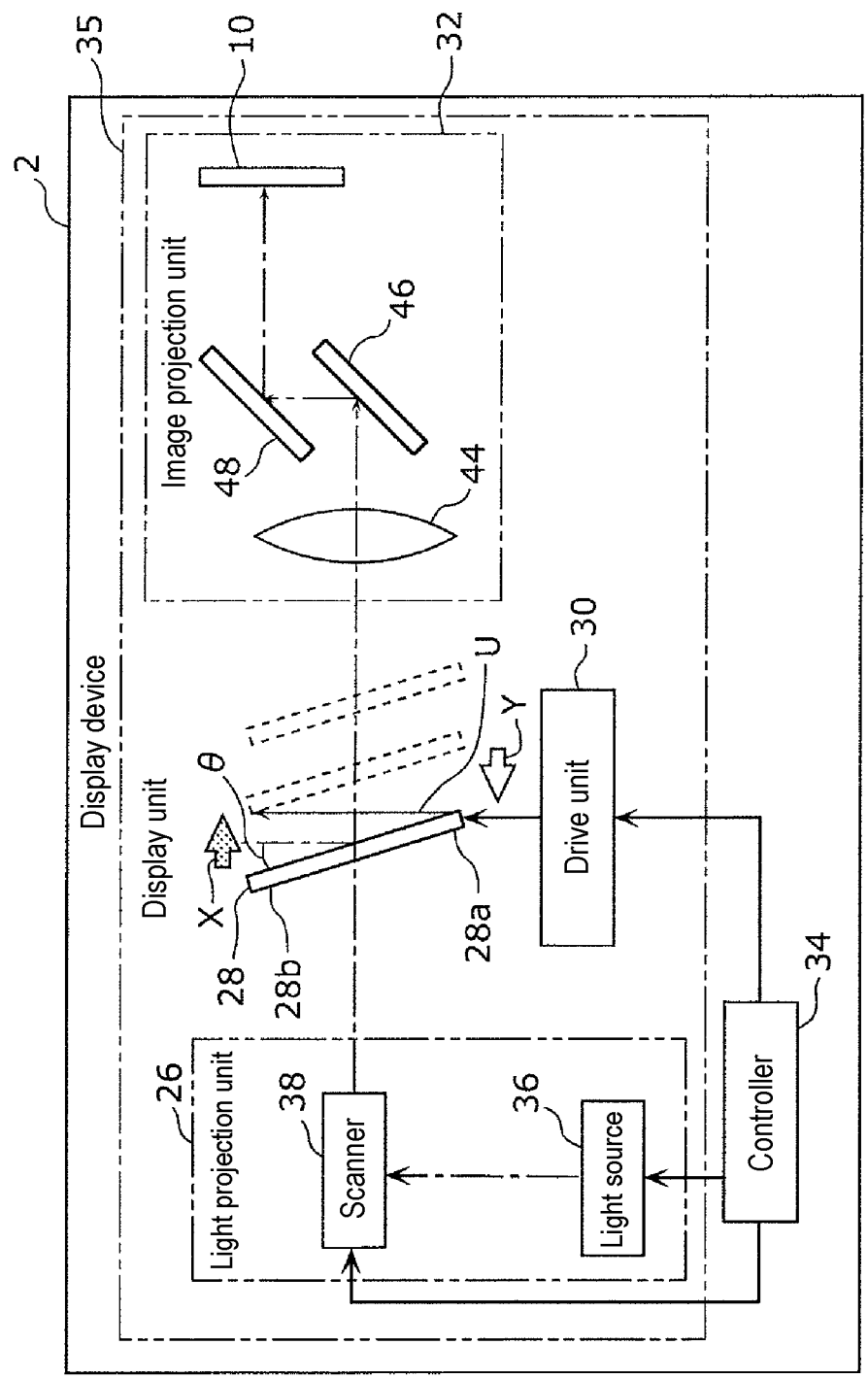
FIG. 5 is a block diagram illustrating a functional configuration of the display device according to the exemplary embodiment.

Next, specific configurations of display device 2 according to the exemplary embodiment will be described with reference to FIGS. 4 and 5. FIG. 4 is a view illustrating the configuration of display device 2 according to the exemplary embodiment. FIG. 5 is a block diagram illustrating a functional configuration of display device 2 according to the exemplary embodiment.

As illustrated in FIGS. 4 and 5, display device 2 includes light projection unit 26, movable screen 28, drive unit 30, image projection unit 32 (an example of an optical system), and controller 34. Light projection unit 26, movable screen 28, drive unit 30, and image projection unit 32 constitute display unit 35.

Light projection unit 26 includes light source 36 and scanner 38. Light source 36 includes a red laser diode that emits a laser light beam having a red component (R), a green laser diode that emits a laser light beam having a green component (G), and a blue laser diode that emits a laser light beam having a blue component (B). The laser light beam having the red component, the laser light beam having the green component, and the laser light beam having the blue component that are emitted from light source 36 are synthesized by, for example, a dichroic mirror (not illustrated) and then enter scanner 38.

Scanner 38 is configured with a micro electro mechanical systems (MEMS) mirror, for example. Scanner 38 reflects the entering laser light beam toward a direction according to a deflection angle thereof, and therefore causes the laser light beam from light source 36 to raster-scan movable screen 28 in a two-dimensional manner. Scanner 38 causes the laser light beam to raster-scan from first end 28a (a lower end in FIG. 5) toward second end 28b (an upper end in FIG. 5) of movable screen 28, for example. Note that first end 28a is an end farther from scanner 38, and second end 28b is an end closer to scanner 38.

Movable screen 28 is a rectangular screen having translucency (for example, semitransparency). As illustrated in FIG. 5, movable screen 28 is disposed so as to reciprocate in a first direction and in a second direction on an optical path of the laser light beam from scanner 38. The first direction is a direction away from scanner 38 (a direction indicated by arrow X in FIG. 5), and the second direction is a direction approaching scanner 38 (a direction indicated by arrow Y in FIG. 5). Further, movable screen 28 reciprocates in a posture inclined to moving directions (first and second directions) of movable screen 28.

When movable screen 28 moves in the first direction, the laser light beam from scanner 38 raster-scans movable screen 28, whereby first screen image 40 (refer to FIG. 7 described later) is formed in movable screen 28. Meanwhile, when movable screen 28 moves in the second direction, the laser light beam from scanner 38 raster-scans movable screen 28, whereby second screen image 42 (refer to FIG. 7 described later) is formed in movable screen 28. Note that methods for forming first screen image 40 and second screen image 42 will be described in detail later.

Drive unit 30 is configured with an actuator, for example. Drive unit 30 causes movable screen 28 to reciprocate (vibrate) in the first and second directions at a constant frequency (for example, 60 Hz) and with constant amplitude (for example, 1 mm), based on a drive signal from controller 34. Note that drive unit 30 causes movable screen 28 to reciprocate such that a period of time during which movable screen 28 moves in the first direction (or the second direction) is, for example, 25 msec or less, based on the drive signal from controller 34.

Image projection unit 32 includes magnifying lens 44, first reflecting plate 46, second reflecting plate 48, and windshield 10.

Magnifying lens 44 is disposed on the optical path of the laser light beam transmitting through movable screen 28. Magnifying lens 44 magnifies first screen image 40 or second screen image 42 formed in movable screen 28.

First reflecting plate 46 and second reflecting plate 48 are disposed on the optical path of the laser light beam from magnifying lens 44, and reflect the laser light beam from magnifying lens 44 toward windshield 10. With this configuration, first reflecting plate 46 and second reflecting plate 48 project first screen image 40 or second screen image 42 magnified by magnifying lens 44 toward windshield 10.

Windshield 10 is disposed on the optical path of the laser light beam from second reflecting plate 48, and reflects the laser light beam from second reflecting plate 48 toward driver 12. With this configuration, when first screen image 40 is formed in movable screen 28, vertical image 18 that is the virtual image of first screen image 40 is displayed in space 16 in front of windshield 10. Meanwhile, when second screen image 42 is formed in movable screen 28, depth image 20 that is the virtual image of second screen image 42 is displayed in space 16 in front of windshield 10. It is to be noted that movable screen 28 reciprocates at a relatively high speed, and therefore driver 12 views first screen image 40 and second screen image 42 as if the two images are displayed simultaneously.

Controller 34 has a function of outputting the drive signal to drive unit 30, a function of controlling a drive current supplied to light source 36, and a function of controlling a deflection angle of scanner 38. Controller 34 is configured with, for example, a central processing unit (CPU) or a processor, and reads and executes a computer program stored in a memory (not illustrated) to perform the above-described functions.

[3. Operation of Display Device]

Figure 6:
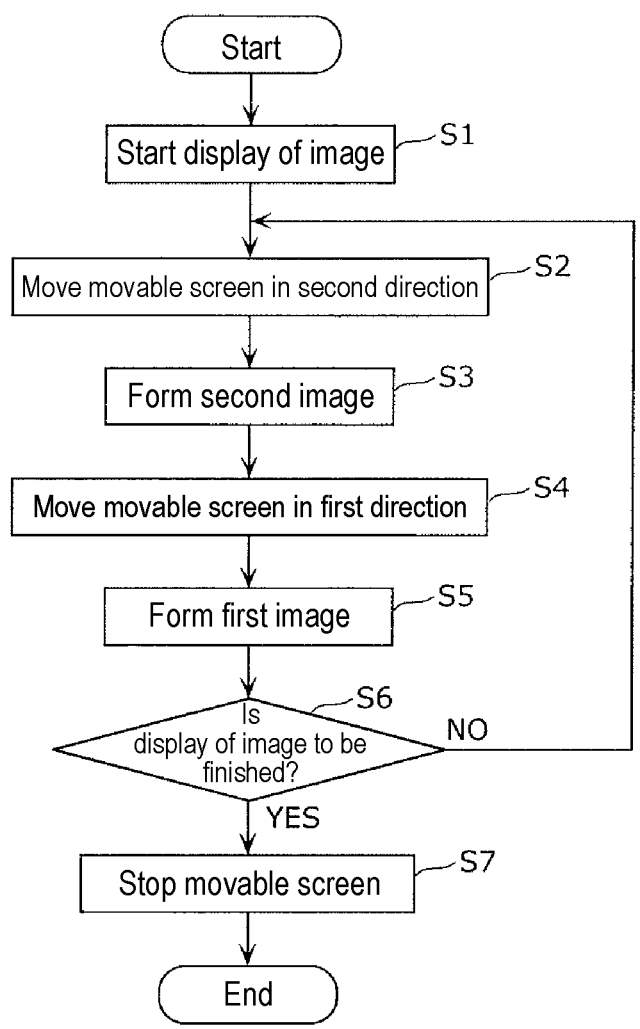
FIG. 6 is a flowchart illustrating a flow of operation of the display device according to the exemplary embodiment.
Figure 7:
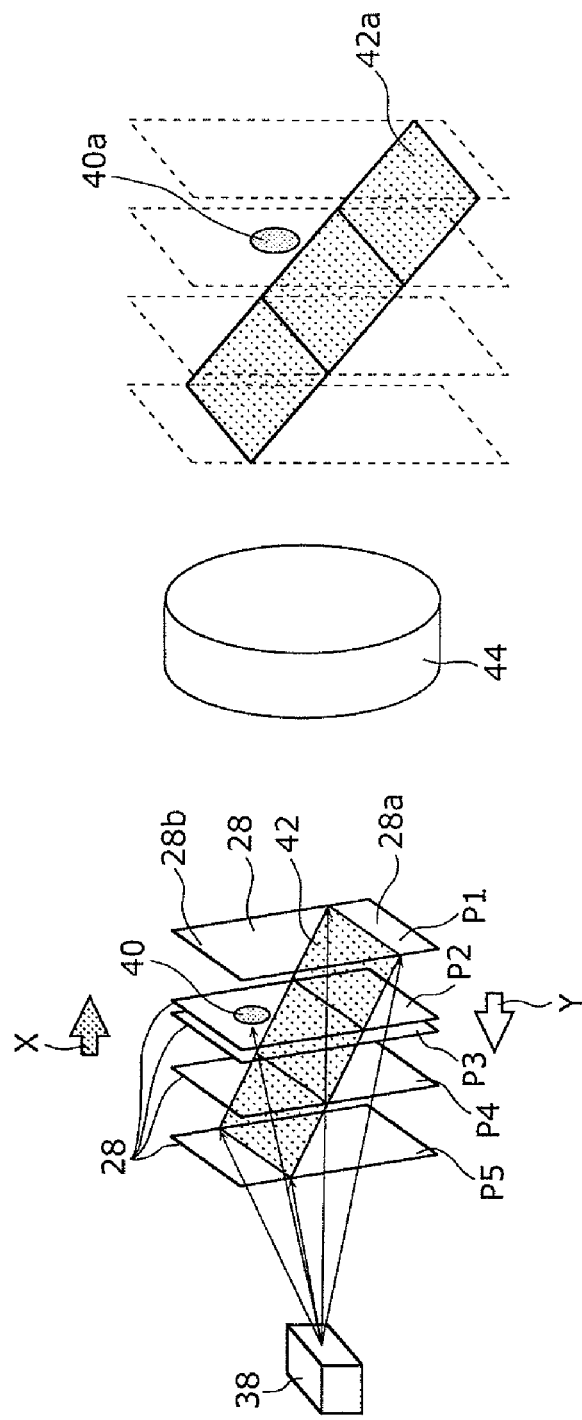
FIG. 7 is a view for describing a method for forming a first screen image and a second screen image performed by the display device according to the exemplary embodiment.
Figure 8:
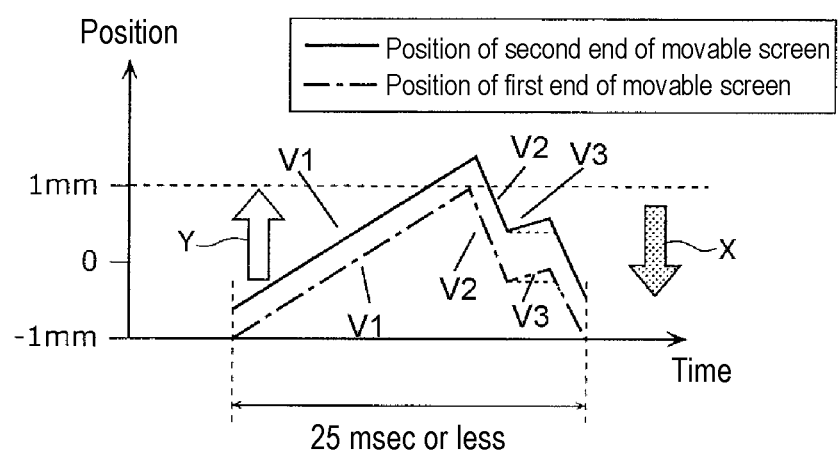
FIG. 8 is a graph illustrating a temporal change of positions of a first end and a second end of a movable screen in the display device according to the exemplary embodiment.

Subsequently, operation of display device 2 according to the exemplary embodiment will now be described with reference to FIGS. 5 to 8. FIG. 6 is a flowchart illustrating a flow of operation of display device 2 according to the exemplary embodiment. FIG. 7 is a view for describing a method for forming first screen image 40 and second screen image 42 performed by display device 2 according to the exemplary embodiment. FIG. 8 is a graph illustrating a temporal change of positions of first end 28a and second end 28b of movable screen 28 in display device 2 according to the exemplary embodiment.

As illustrated in FIG. 6, display of image 8 is started (S1), and then movable screen 28 starts reciprocating in the first direction and the second direction. As illustrated in FIG. 7, when movable screen 28 moves from position P1 to position P5 in the second direction (a direction indicated by arrow Y in FIG. 7) (S2), the laser light beam from scanner 38 raster-scans movable screen 28 and transmits through movable screen 28, whereby second screen image 42 is formed in movable screen 28 (S3). Specifically, as illustrated in FIG.

7, while movable screen 28 moves from position P1 to position P5 through position P2, position P3, and position P4, a position of the laser light beam transmitting through movable screen 28 moves from first end 28a toward second end 28b of movable screen 28. This causes a forming direction of second screen image 42 to be a direction inclined to the moving directions of movable screen 28. As illustrated in FIG. 8, while movable screen 28 moves in the second direction, a moving speed of movable screen 28 is constant at first speed V1.

As illustrated in FIG. 7, second screen image 42 formed in movable screen 28 is magnified by magnifying lens 44, and therefore, second intermediate image 42a that is the virtual image of second screen image 42 is formed on the light-emitting side of magnifying lens 44. Second intermediate image 42a described above is reflected by first reflecting plate 46 and second reflecting plate 48 to be projected on windshield 10. Therefore, depth image 20 that is the virtual image of second screen image 42 is displayed in space 16 in front of windshield 10. At this time, a display direction of depth image 20 is a direction corresponding to the forming direction of second screen image 42, that is, the above-described depth direction.

Meanwhile, as illustrated in FIG. 7, when movable screen 28 moves from position P5 to position P1 in the first direction (a direction indicated by arrow X in FIG. 7) (S4), the laser light beam from scanner 38 raster-scans movable screen 28 and transmits through movable screen 28, whereby first screen image 40 is formed in movable screen 28 (S5). Specifically, as illustrated in FIG. 7, while movable screen 28 moves from position P3 to position P2, the position of the laser light beam transmitting through movable screen 28 moves in a direction from first end 28a toward second end 28b of movable screen 28. With this configuration, a forming direction of first screen image 40 is made perpendicular to the moving directions of movable screen 28, as indicated by arrow U in FIG. 5.

As illustrated in FIG. 8, at timing when the moving speed of movable screen 28 shifts from second speed V2 to third speed V3, first screen image 40 is formed in movable screen 28.

As illustrated in FIG. 7, first screen image 40 formed in movable screen 28 is magnified by magnifying lens 44, and therefore, first intermediate image 40a that is the virtual image of first screen image 40 is formed on the light-emitting side of magnifying lens 44. First intermediate image 40a described above is reflected by first reflecting plate 46 and second reflecting plate 48 to be projected on windshield 10. Therefore, vertical image 18 that is the virtual image of first screen image 40 is displayed in space 16 in front of windshield 10. At this time, a display direction of vertical image 18 is a direction corresponding to the forming direction of first screen image 40, that is, the above-described vertical direction.

When the display of image 8 is performed continuously (NO in S6), steps S2 to S5 described above are executed again. When the display of image 8 is to be finished (YES in S6), movable screen 28 stops reciprocating (S7).

[4. First Display Example]

Figure 9A:
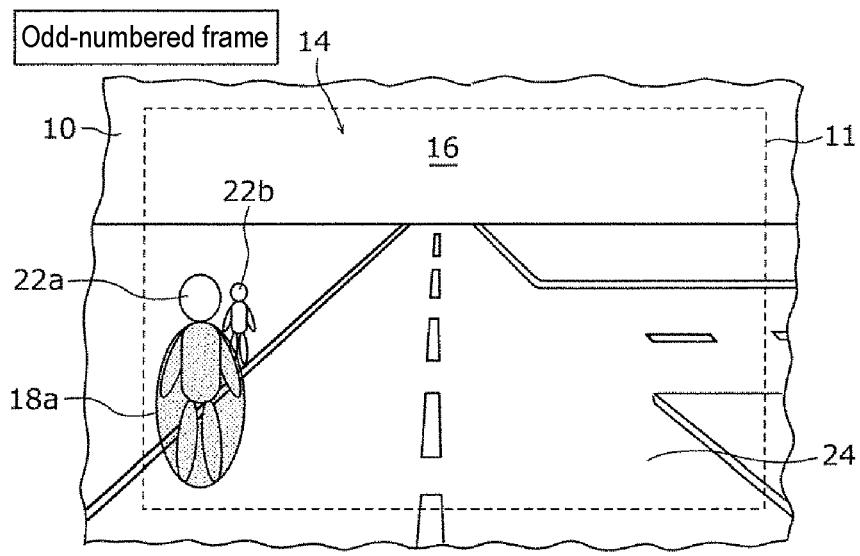
FIG. 9A is a view illustrating an example of a first vertical image displayed by the display device in a first display example.
Figure 9B:
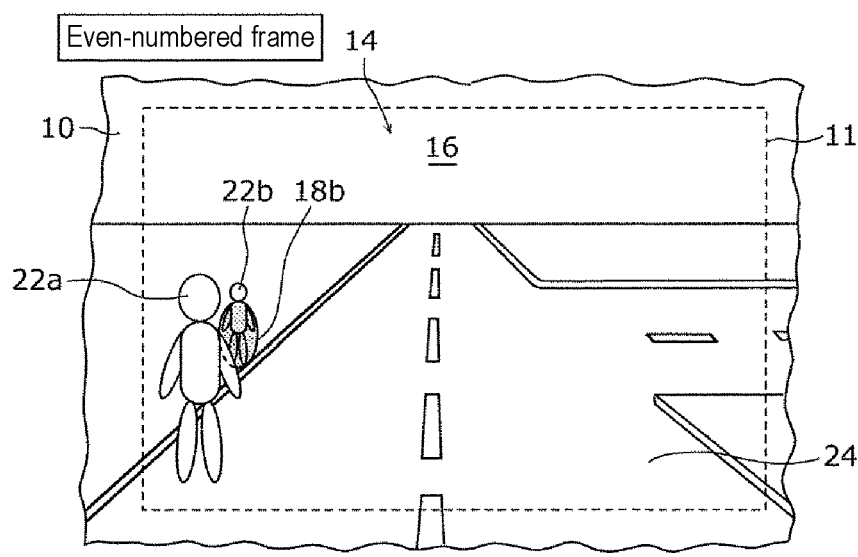
FIG. 9B is a view illustrating an example of a second vertical image displayed by the display device in the first display example.
Figure 10:
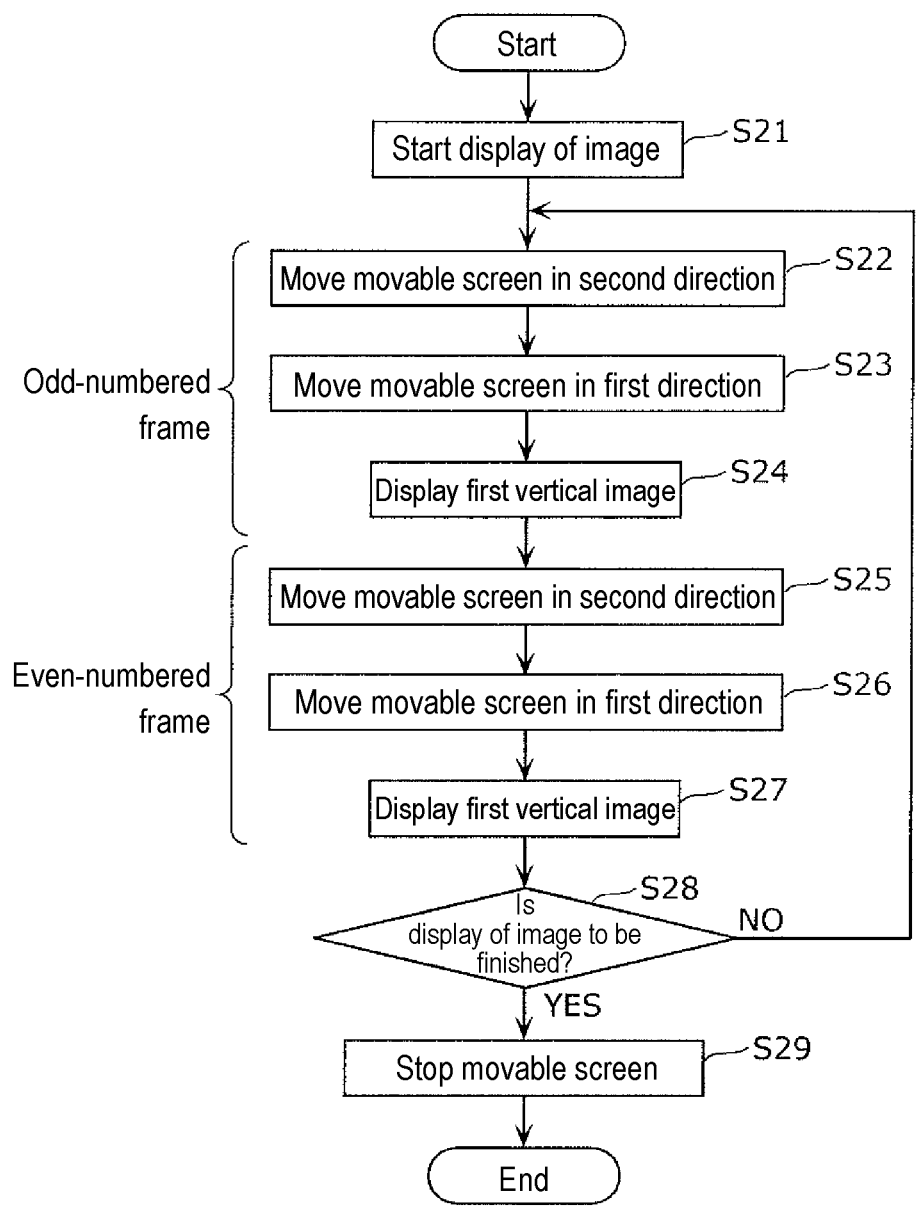
FIG. 10 is a flowchart illustrating a flow of operation of the display device in the first display example.
Figure 11:
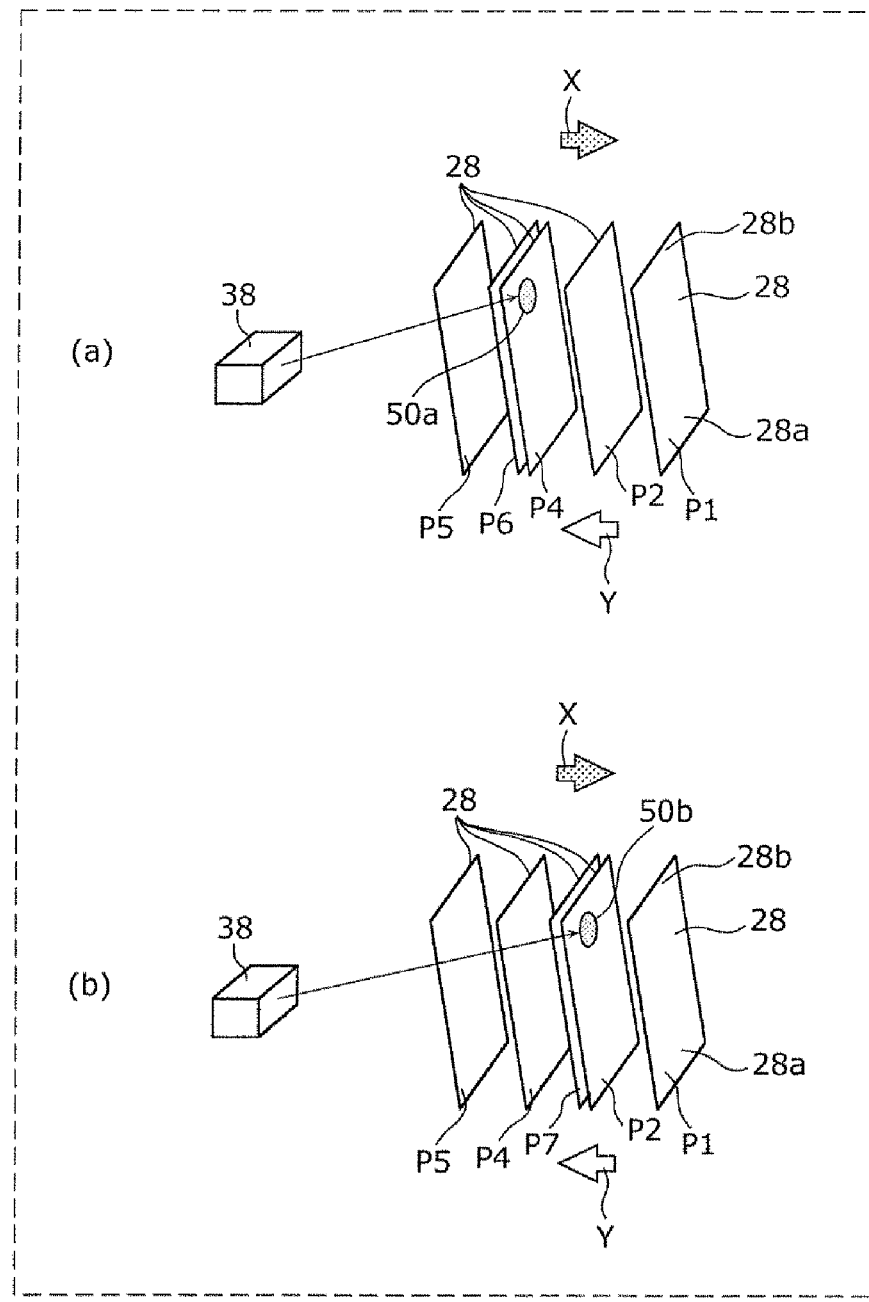
FIG. 11 is a view for describing the operation of the display device in the first display example.

Subsequently, a first display example of display device 2 according to the exemplary embodiment will be described with reference to FIGS. 9A to 11. FIG. 9A is a view illustrating one example of first vertical image 18a displayed by display device 2 in the first display example. FIG. 9B is a view illustrating one example of second vertical image 18b displayed by display device 2 in the first display example. FIG. 10 is a flowchart illustrating a flow of operation of display device 2 in the first display example. FIG. 11 is a view for describing the operation of display device 2 in the first display example.

As illustrated in FIGS. 9A and 9B, in the first display example, first vertical image 18a (an example of a first image) and second vertical image 18b (an example of a second image) are displayed in a time-division manner. For example, first vertical image 18a is displayed superimposed on pedestrian 22a present in front of vehicle 4 at a position distant from vehicle 4 by about 25 m. Further, second vertical image 18b is displayed superimposed on pedestrian 22b present in front of vehicle 4 at a position distant from vehicle 4 by about 64 m. Accordingly, first vertical image 18a and second vertical image 18b have different distance from windshield 10 in the depth direction (direction perpendicular to the sheet surface of FIG. 9A and FIG. 9B). It is to be noted that, because first vertical image 18a and second vertical image 18b are alternately displayed at a relatively high speed, driver 12 views first vertical image 18a and second vertical image 18b as if the two images are displayed simultaneously.

Controller 34 controls display unit 35 so that first vertical image 18a and second vertical image 18b are displayed in a time-division manner based on image data acquired from an image data generator (not illustrated). The image data is data in which odd-numbered frames and even-numbered frames are alternately displayed at 60 frames per second. Controller 34 displays first vertical image 18a in the odd-numbered frame and displays second vertical image 18b in the even-numbered frame. Thus, first vertical image 18a and second vertical image 18b are displayed in a time-division manner.

Next, the operation of display device 2 in the first display example will be described. As illustrated in FIG. 10, display of first vertical image 18a and second vertical image 18b is started (S21), and then movable screen 28 starts reciprocating in the first direction and the second direction.

As illustrated in part (a) of FIG. 11, in the odd-numbered frame of the image data, movable screen 28 moves from position P1 to position P5 in the second direction (direction indicated by arrow Y in FIG. 11) (S22), and then, moves from position P5 to position P1 in the first direction (direction indicated by arrow X in FIG. 11) (S23). When movable screen 28 moves in the first direction, the laser light beam from scanner 38 raster-scans movable screen 28 and transmits through movable screen 28, whereby first screen image 50a is formed in movable screen 28. Specifically, as illustrated in part (a) of FIG. 11, while movable screen 28 moves from position P6 to position P4, the position of the laser light beam transmitting through movable screen 28 moves in a direction from first end 28a toward second end 28b of movable screen 28. First vertical image 18a that is the virtual image of first screen image 50a is projected on windshield 10 in the same manner as described above, thereby being displayed in space 16 in front of windshield 10 (S24).

Thereafter, as illustrated in part (b) of FIG. 11, in the even-numbered frame of the image data, movable screen 28 moves from position P1 to position P5 in the second direction (S25), and then, moves from position P5 to position P1 in the first direction (S26). When movable screen 28 moves in the first direction, the laser light beam from scanner 38 raster-scans movable screen 28 and transmits through movable screen 28, whereby second screen image 50b is formed in movable screen 28. Specifically, as illustrated in part (b) of FIG. 11, while movable screen 28 moves from position P7 to position P2, the position of the laser light beam transmitting through movable screen 28 moves in a direction from first end 28*a* toward second end 28*b* of movable screen 28. Second vertical image 18*b* that is the virtual image of second screen image 50*b* is projected on windshield 10 in the same manner as described above, thereby being displayed in space 16 in front of windshield 10 (S27).

When the display of first vertical image 18*a* and second vertical image 18*b* is performed continuously (NO in S28), steps S22 to S27 described above are executed again. When the display of first vertical image 18*a* and second vertical image 18*b* is to be finished (YES in S28), movable screen 28 stops reciprocating (S29).

In the present display example, first vertical image 18*a* is displayed in the odd-numbered frame, and second vertical image 18*b* is displayed in the even-numbered frame. However, the method for displaying first vertical image 18*a* and second vertical image 18*b* in a time-division manner is not limited thereto. For example, first vertical image 18*a* and second vertical image 18*b* may be alternately displayed every two or more frames (for example, every ten frames). That is, first vertical image 18*a* is displayed in the first to tenth frames, and second vertical image 18*b* is displayed in the eleventh to twentieth frames.

While the method for displaying two images at different distances using movable screen 28 has been described above, a method for displaying two images at different distances using a parallax image may be employed, in place of the above-described method, to display first vertical image 18*a* and second vertical image 18*b*.

Moreover, although movable screen 28 reciprocates in this display example, the whole of display device 2 may reciprocate.

[5. Second Display Example]

Figure 12:
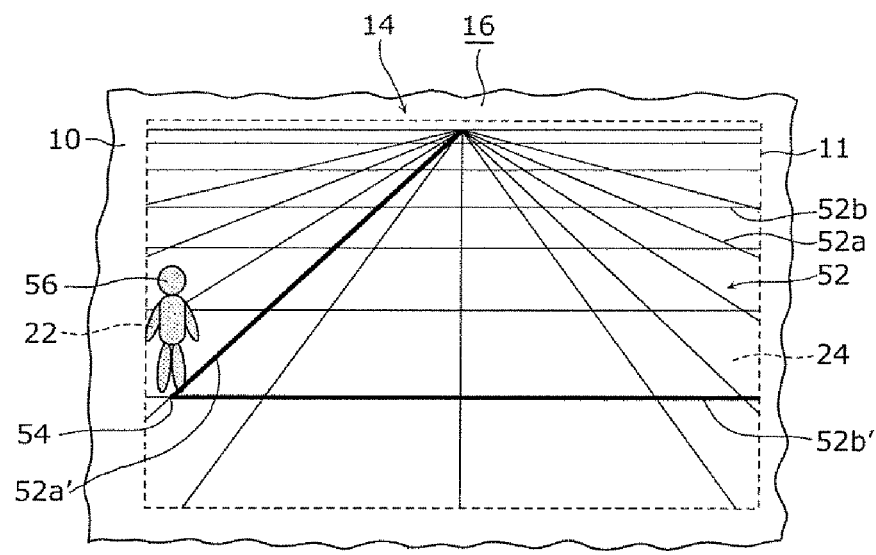
FIG. 12 is a view illustrating one example of a reference pattern and a pedestrian image which are displayed by the display device in a second display example.

Subsequently, a second display example of display device 2 according to the exemplary embodiment will be described with reference to FIG. 12. FIG. 12 is a view illustrating one example of reference pattern 52 and pedestrian image 56 which are displayed by display device 2 in the second display example.

As illustrated in FIG. 12, in the second display example, controller 34 controls display unit 35 so that reference pattern 52 superimposed on pedestrian 22 (an example of a subject) present in space 16 in front of windshield 10 is displayed. Reference pattern 52 is a grid pattern in which a plurality of vertical lines 52*a* and a plurality of horizontal lines 52*b* intersect at right angles. Reference pattern 52 is displayed superimposed on road 24 present in front of vehicle 4 as the above-described depth image. In addition, reference pattern 52 is displayed such that the position of pedestrian 22 is at intersection point 54 between vertical lines 52*a* and horizontal lines 52*b* (that is, reference pattern 52 is displayed so as to correspond to the position of pedestrian 22).

Further, controller 34 displays pedestrian image 56 to be superimposed on pedestrian 22 as the above-described vertical image such that pedestrian image 56 is superimposed on reference pattern 52. Pedestrian image 56 is, for example, a human-shaped marker. In this case, a part of reference pattern 52 corresponding to the position of pedestrian image 56, that is, both two lines which are vertical line 52*a*' and horizontal line 52*b*' intersecting at intersection point 54, are displayed in a highlighted manner. Examples of conceivable methods for providing a highlighted display include displaying both vertical line 52*a*' and horizontal line 52*b*' in a thick line, and displaying both two lines in an eye-catching color. Driver 12 can ascertain the position of pedestrian 22 by viewing pedestrian image 56.

Controller 34 controls display unit 35 so that reference pattern 52 and pedestrian image 56 described above are displayed based on image data generated by capturing an image of scene 14 (including pedestrian 22 and road 24) in front of vehicle 4 with a camera (not illustrated) mounted to vehicle 4.

Note that, although reference pattern 52 and pedestrian image 56 are displayed in a 3D manner in the present display example, reference pattern 52 and pedestrian image 56 may be displayed in a 2D manner.

Figure 17:
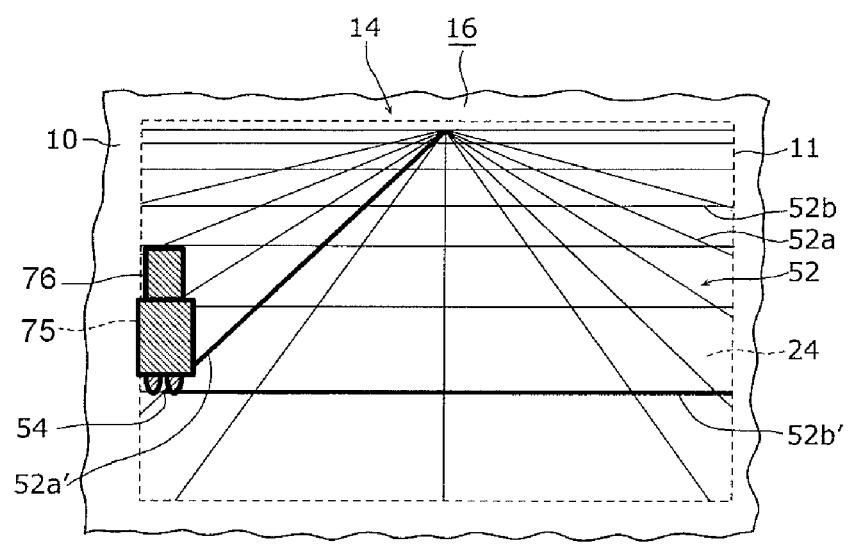
FIG. 17 is a view illustrating one example of a reference pattern and a vehicle image which are displayed by the display device in the second display example.
Figure 18:
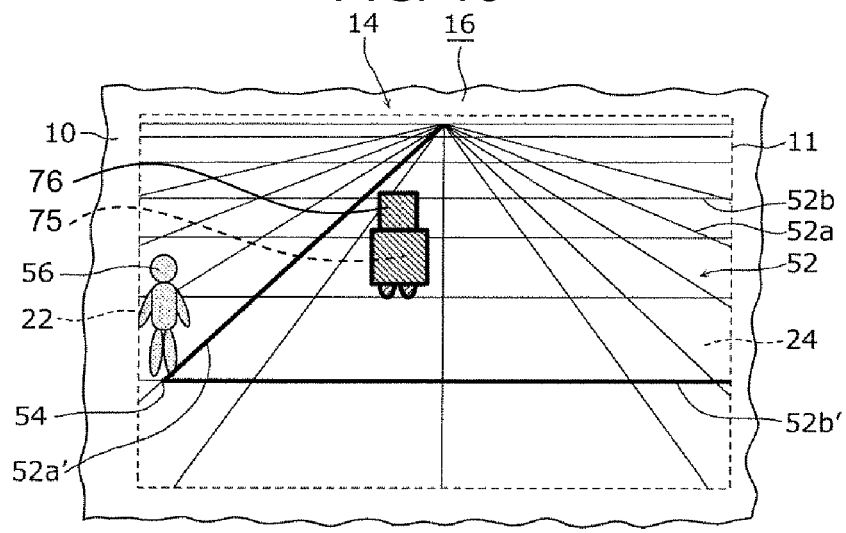
FIG. 18 is a view illustrating one example of superimposition of a reference pattern over a pedestrian image and a vehicle image which are displayed by the display device in the second display example.

Further, as illustrated in FIG. 17, controller 34 controls display unit 35 so that reference pattern 52 to be superimposed on vehicle (preceding vehicle) 75 (an example of the subject) present in space 16 in front of windshield 10 is displayed. In this case, controller 34 may display vehicle image 76 to be superimposed on vehicle 75 as the above-described vertical image such that vehicle image 76 is superimposed on reference pattern 52. Further, in this case, controller 34 may display, in addition to pedestrian image 56, vehicle image 76 to be superimposed on vehicle 75 as the above-described vertical image such that vehicle image 76 is superimposed on reference pattern 52, as illustrated in FIG. 18.

[6. Third Display Example]

Figure 13:
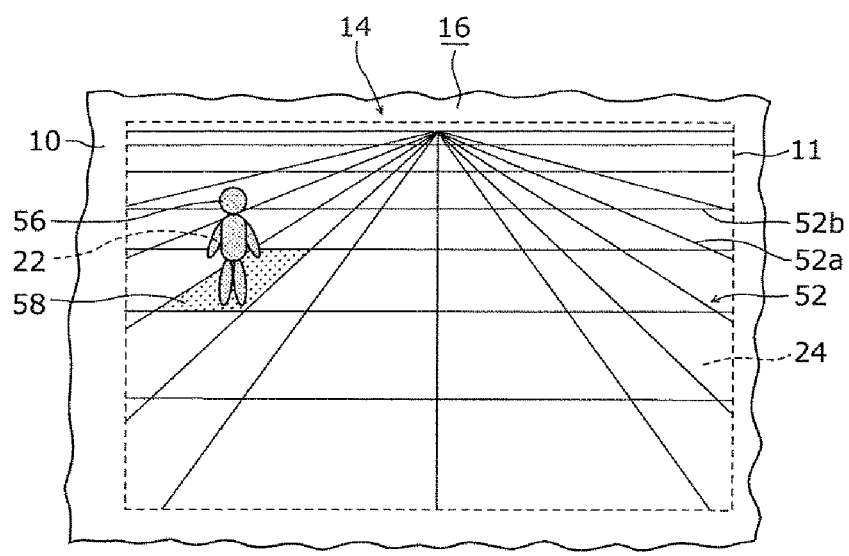
FIG. 13 is a view illustrating one example of a reference pattern and a pedestrian image which are displayed by the display device in a third display example.

Subsequently, a third display example of display device 2 according to the exemplary embodiment will be described with reference to FIG. 13. FIG. 13 is a view illustrating one example of reference pattern 52 and pedestrian image 56 which are displayed by display device 2 in the third display example.

As illustrated in FIG. 13, in the third display example, controller 34 controls display unit 35 so that reference pattern 52 to be superimposed on pedestrian 22 present in space 16 in front of windshield 10 is displayed, as in the second display example. Reference pattern 52 is displayed such that the position of pedestrian 22 is within section 58 (that is, in an area enclosed by a pair of adjacent vertical lines 52*a* and a pair of adjacent horizontal lines 52*b*) of the grid pattern (that is, reference pattern 52 is displayed so as to correspond to the position of pedestrian 22). Further, controller 34 displays pedestrian image 56 to be superimposed on pedestrian 22 as the above-described vertical image such that pedestrian image 56 is superimposed on reference pattern 52.

Moreover, in the third display example, a part of reference pattern 52 corresponding to the position of pedestrian image 56, that is, section 58 of the grid pattern where pedestrian image 56 is located, is displayed in a highlighted manner as illustrated in FIG. 13. Examples of conceivable methods for providing a highlighted display include displaying section 58 in an eye-catching color, or displaying a pair of vertical lines 52*a* and a pair of horizontal lines 52*b* enclosing section 58 in a thick line. Driver 12 can ascertain the position of pedestrian 22 by viewing pedestrian image 56.

Note that, although reference pattern 52 and pedestrian image 56 are displayed in a 3D manner in the present display example, reference pattern 52 and pedestrian image 56 may be displayed in a 2D manner.

[7. Fourth Display Example]

Figure 14:
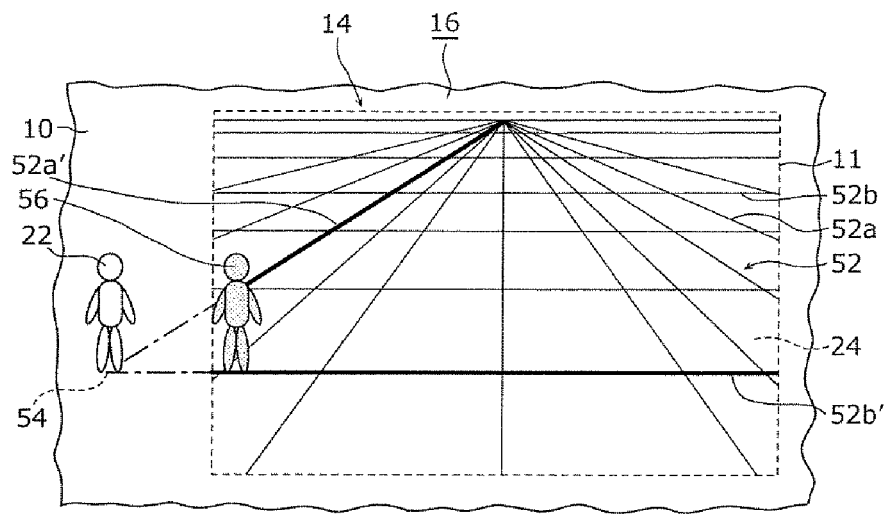
FIG. 14 is a view illustrating one example of a reference pattern and a pedestrian image which are displayed by the display device in a fourth display example.

Subsequently, a fourth display example of display device 2 according to the exemplary embodiment will be described with reference to FIG. 14. FIG. 14 is a view illustrating one example of reference pattern 52 and pedestrian image 56 which are displayed by display device 2 in the fourth display example.

As illustrated in FIG. 14, in the fourth display example, controller 34 controls display unit 35 so that reference pattern 52 to be superimposed on pedestrian 22 present in space 16 in front of windshield 10 is displayed, as in the second display example. Reference pattern 52 is displayed such that the position of pedestrian 22 is at intersection point 54 between vertical lines 52a and horizontal lines 52b of the grid pattern. Further, controller 34 displays pedestrian image 56 to be superimposed on pedestrian 22 as the above-described vertical image such that pedestrian image 56 is superimposed on reference pattern 52.

In addition, in the fourth display example, when the position of pedestrian 22 is not superimposed on reference pattern 52, controller 34 displays pedestrian image 56 so as to be superimposed on a predetermined area (for example, an area nearest to the position of pedestrian 22 as viewed from driver 12) of reference pattern 52, as illustrated in FIG. 14. In this case, a part of reference pattern 52 corresponding to the position of pedestrian 22 at the outside of reference pattern 52, that is, two lines which are vertical line 52a' and horizontal line 52b' intersecting at intersection point 54, are displayed in a highlighted manner. Examples of conceivable methods for providing a highlighted display include displaying both vertical line 52a' and horizontal line 52b' in a thick line, and displaying both two lines in an eye-catching color. Driver 12 can ascertain the position of pedestrian 22 by viewing pedestrian image 56, even when the position of pedestrian 22 is not superimposed on reference pattern 52.

Note that, although reference pattern 52 and pedestrian image 56 are displayed in a 3D manner in the present display example, reference pattern 52 and pedestrian image 56 may be displayed in a 2D manner.

Figure 19:
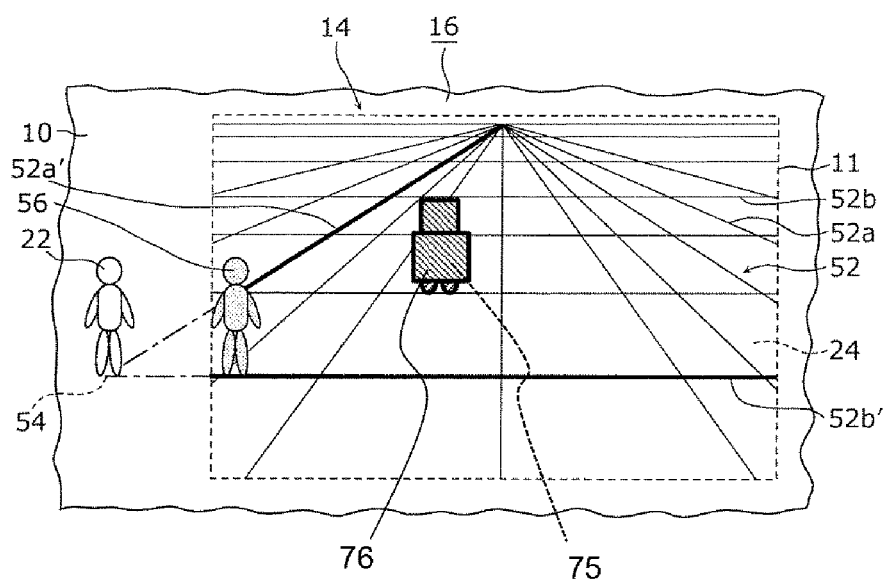
FIG. 19 is a view illustrating one example of superimposition of a reference pattern over a pedestrian image and a vehicle image which are displayed by the display device in the fourth display example.

Further, as illustrated in FIG. 19, controller 34 may display, in addition to pedestrian image 56, vehicle image 76 to be superimposed on vehicle 75 as the above-described vertical image such that vehicle image 76 is superimposed on reference pattern 52.

Figure 20:
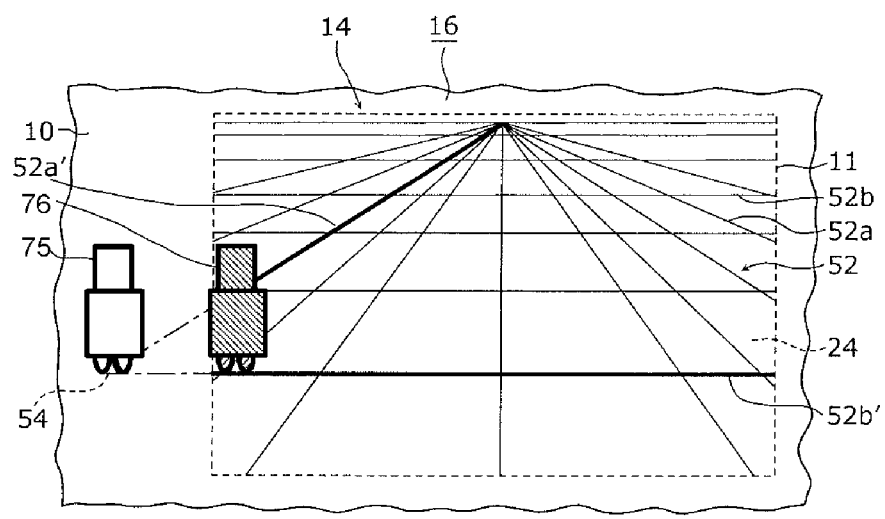
FIG. 20 is a view illustrating one example of a reference pattern and a vehicle image displayed by the display device in the fourth display example.

Further, as illustrated in FIG. 20, controller 34 controls display unit 35 so that reference pattern 52 to be superimposed on vehicle (preceding vehicle) 75 (an example of the subject) present in space 16 in front of windshield 10 is displayed. In this case, controller 34 may display vehicle image 76 to be superimposed on vehicle 75 as the above-described vertical image such that vehicle image 76 is superimposed on reference pattern 52.

[8. Fifth Display Example]

Figure 15:
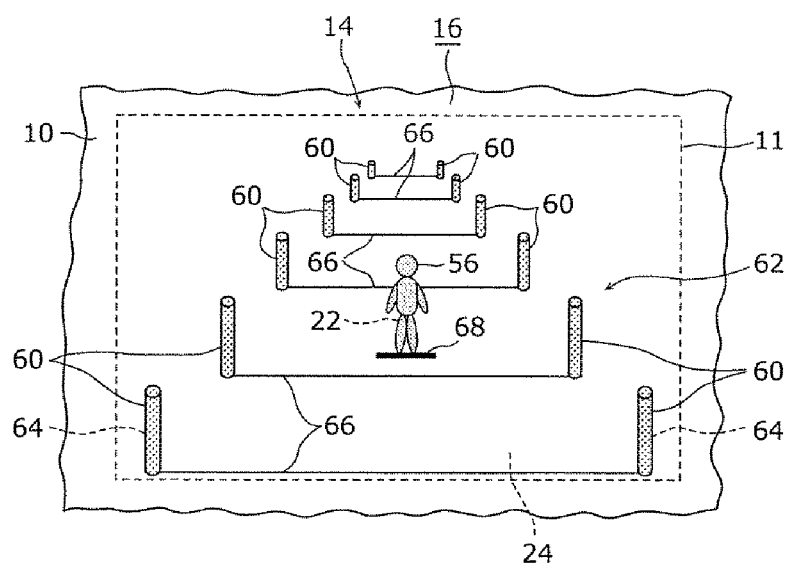
FIG. 15 is a view illustrating one example of a reference pattern and a pedestrian image which are displayed by the display device in a fifth display example.

Subsequently, a fifth display example of display device 2 according to the exemplary embodiment will be described with reference to FIG. 15. FIG. 15 is a view illustrating one example of reference pattern 62 and pedestrian image 56 which are displayed by display device 2 in the fifth display example.

As illustrated in FIG. 15, in the fifth display example, controller 34 controls display unit 35 so that reference pattern 62 including a plurality of guard rail images 60 is displayed. Guard rail images 60 are images to be respectively superimposed on a plurality of guard rails 64 (an example of the subject) present in space 16 in front of windshield 10. Reference pattern 62 is a pattern including these guard rail images 60 and horizontal lines 66, each of horizontal lines 66 connecting lower ends of a pair of guard rail images 60 facing each other across road 24. Reference pattern 62 is displayed superimposed on road 24 present in front of vehicle 4 as the above-described depth image. Reference pattern 62 is also displayed such that guard rail images 60 are respectively superimposed on guard rails 64 (such that guard rail images 60 correspond to positions of guard rails 64, respectively).

Further, controller 34 displays pedestrian image 56 to be superimposed on pedestrian 22 as the above-described vertical image such that pedestrian image 56 is superimposed on reference pattern 62. In this case, marker 68 extending substantially parallel to horizontal lines 66 is displayed under the feet of pedestrian image 56. Marker 68 is a marker indicating the position of pedestrian 22 in the depth direction. Driver 12 can ascertain the position of pedestrian 22 in the depth direction by viewing the space between marker 68 and horizontal lines 66.

Note that, although reference pattern 62 and pedestrian image 56 are displayed in a 3D manner in the present display example, reference pattern 62 and pedestrian image 56 may be displayed in a 2D manner. In addition, reference pattern 62 may include a roadside tree image superimposed on a roadside tree present in space 16 in front of windshield 10, in place of guard rail image 60.

[9. Sixth Display Example]

Figure 16:
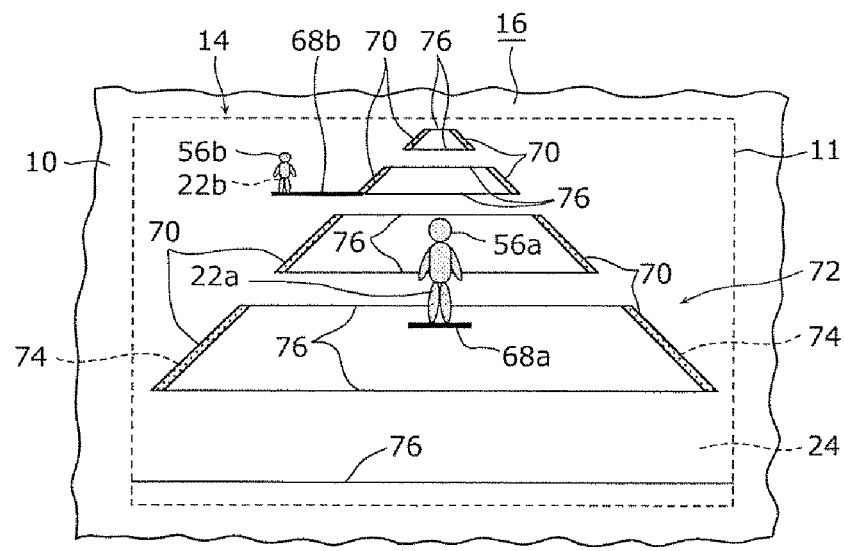
FIG. 16 is a view illustrating one example of a reference pattern and a pedestrian image which are displayed by the display device in a sixth display example.

Subsequently, a sixth display example of display device 2 according to the exemplary embodiment will be described with reference to FIG. 16. FIG. 16 is a view illustrating one example of reference pattern 72 and pedestrian images 56a and 56b which are displayed by display device 2 in the sixth display example.

As illustrated in FIG. 16, in the sixth display example, controller 34 controls display unit 35 so that reference pattern 72 including a plurality of traffic lane line images 70 is displayed. Traffic lane line images 70 are images to be respectively superimposed on a plurality of traffic lane lines 74 (an example of the subject) present in space 16 in front of windshield 10. Reference pattern 72 is a pattern including these traffic lane line images 70 and pairs of horizontal lines 76, each pair of horizontal lines 76 connecting both ends of a pair of traffic lane line images 70 and facing each other across road 24. Reference pattern 72 is displayed superimposed on road 24 present in front of vehicle 4 as the above-described depth image. Reference pattern 72 is also displayed such that traffic lane line images 70 are respectively superimposed on traffic lane lines 74 (such that traffic lane line images 70 correspond to positions of traffic lane lines 74, respectively).

Further, controller 34 displays pedestrian images 56a and 56b to be respectively superimposed on pedestrians 22a and 22b as the above-described vertical image such that pedestrian images 56a and 56b are superimposed on reference pattern 72. In this case, markers 68a and 68b extending substantially parallel to horizontal lines 76 are displayed under the feet of pedestrian images 56a and 56b. Driver 12 can ascertain the positions of pedestrians 22a and 22b in the depth direction by viewing the space between each of markers 68a and 68b and horizontal lines 66.

Note that, although reference pattern 72 and pedestrian images 56a and 56b are displayed in a 3D manner in the present display example, reference pattern 72 and pedestrian images 56a and 56b may be displayed in a 2D manner.

[10. Effects]

Subsequently, effects obtained from display device 2 according to the exemplary embodiment will be described. As described in the second to sixth display examples, reference patterns 52, 62, and 72 to be superimposed on a subject (such as pedestrian 22) present in space 16 are displayed so as to correspond to the position of the subject. Accordingly, pedestrian image 56a to be superimposed on pedestrian 22 present in space 16, for example, is superimposed on reference patterns 52, 62, and 72, whereby driver 12 can easily ascertain the distance from windshield 10 to pedestrian 22, for example, based on reference patterns 52, 62, and 72.

(Modifications)

While the display device according to one or more aspects has been described above based on the exemplary embodiment, the present disclosure is not limited to the exemplary embodiment. Configurations in which various variations conceived by those skilled in the art are applied to the present exemplary embodiment, and configurations established by combining components in different exemplary embodiments or modifications may also fall within the scope of one or more aspects, without departing from the gist of the present invention.

For example, the above exemplary embodiment has described a case where display device 2 is mounted on vehicle 4. However, the present disclosure is not limited thereto, and display device 2 may be mounted on motorcycles, airplanes, trains, or ships, for example.

Although the above exemplary embodiment has described a case where display device 2 is mounted on the vehicle, the present disclosure is not limited thereto. Display device 2 may be mounted on, for example, glasses configured as wearable devices.

Further, the moving directions of movable screen 28 when first screen image 40 and second screen image 42 are formed may be reverse to the directions described in the above exemplary embodiment. That is, when movable screen 28 moves in the second direction, the laser light beam from scanner 38 may raster-scan movable screen 28 to form first screen image 40 in movable screen 28. Meanwhile, when movable screen 28 moves in the first direction, the laser light beam from scanner 38 may raster-scan movable screen 28 to form second screen image 42 in movable screen 28.

In the above exemplary embodiment, movable screen 28 reciprocates in a posture inclined to moving directions of movable screen 28. However, movable screen 28 may reciprocate in a posture substantially perpendicular to the moving directions of movable screen 28. In this case, when movable screen 28 makes a sudden stop, first vertical image 18a or second vertical image 18b is displayed.

In the above exemplary embodiment, pedestrian image 56 (56a, 56b) superimposed on pedestrian 22 (22a, 22b) is displayed. However, the present disclosure is not limited thereto. For example, a preceding vehicle image superimposed on a preceding vehicle or a bicycle image superimposed on a bicycle may be displayed.

In the foregoing exemplary embodiment, the constituent elements may be implemented in dedicated hardware or with execution of software programs individually suitable for those constituent elements. The constituent elements may be implemented by a program execution section, such as a CPU or a processor, reading and executing software programs stored in a recording medium, such as a hard disk or a semiconductor memory.

Furthermore, the following cases are also involved in the present invention.

(1) Specifically, the above-described devices can be implemented using a computer system configured with a microprocessor, a read only memory (ROM), a random access memory (RAM), a hard disk unit, display unit, keyboard, mouse, and the like. A computer program is stored in the RAM or the hard disk unit. The microprocessor operates according to the computer program, and therefore the devices achieve the respective functions. Herein, the computer program is configured by combining a plurality of instruction codes that indicate instructions to a computer, in order to achieve predetermined functions.

(2) A part or all of the constituent elements configuring the above-described devices may be configured with a single-chip system large-scale-integration (LSI). The system LSI is a super multi-functional LSI manufactured such that a plurality of constituent units is integrated into a single chip, and specifically, is a computer system including the microprocessor, the ROM, the RAM, and the like. The ROM stores the computer program. The microprocessor loads the computer program from the ROM to the RAM, and performs operation such as computation according to the loaded computer program, and thus the system LSI achieves its functions.

(3) A part or all of the constituent elements configuring the above-described devices may be configured with an integrated circuit (IC) card detachable from each of the devices, or a single module. The IC card or the module is the computer system configured with the microprocessor, the ROM, the RAM, and the like. The IC card or the module may include the above-described super multi-functional LSI. The microprocessor operates according to the computer program, and thus the IC card or the module achieves its functions. The IC card or the module may have tamper resistance.

(4) The present invention may be implemented by using the above-described methods. Those methods may be implemented by using the computer program that is implemented by the computer, or may be implemented by using digital signals according to the computer program.

Furthermore, the present invention may be implemented by using a configuration that stores the computer program or the digital signals into a computer-readable recording medium such as a flexible disk, a hard disk, a compact disc (CD)-ROM, a magneto-optical disc (MO), a digital versatile disc (DVD), a DVD-ROM, a DVD-RAM, a Blu-ray (registered trademark) disc (BD), and a semiconductor memory. In addition, the present invention may be implemented by using the digital signals stored in those recording media.

The present invention may transmit the computer program or the digital signals via a network represented by a telecommunications line, a wireless or wired communication line, and the Internet, data broadcasting, and the like.

The present invention may be the computer system including the microprocessor and the memory. The memory may store the computer program, and the microprocessor may operate according to the computer program.

The program or the digital signals may be performed by another computer system that is independently provided, by being stored into a recording medium to be transported to the other computer, or by being transported to the other computer via networks and the like.

(5) The above-described exemplary embodiment and the above-described modifications may be combined.

INDUSTRIAL APPLICABILITY

A display device according to the present invention is applicable to a vehicle-mounted head-up display, for example.

REFERENCE MARKS IN THE DRAWINGS

2: display device
4: vehicle
6: dashboard
8: image

10: windshield
11: area
12: driver
14: scene
16: space
18: vertical image
18a: first vertical image
18b: second vertical image
20: depth image
22, 22a, 22b: pedestrian
24: road
26: light projection unit
28: movable screen
28a: first end
28b: second end
30: drive unit
32: image projection unit
34: controller
35: display unit
36: light source
38: scanner
40, 50a: first screen image
40a: first intermediate image
42, 50b: second screen image
42a: second intermediate image
44: magnifying lens
46: first reflecting plate
48: second reflecting plate
52, 62, 72: reference pattern
52a, 52a': vertical line
52b, 52b', 66, 76: horizontal line
54: intersection point
56, 56a, 56b: pedestrian image
58: section
60: guard rail image
64: guard rail
68, 68a, 68b: marker
70: traffic lane line image
74: traffic lane line

The invention claimed is:

1. A display device comprising:
an optical system configured to project an image on a vehicular windshield, the image projected on the vehicular windshield being displayed as a virtual image in a space in front of the vehicular windshield, the image including at least a grid pattern image and a subject image;
a processor; and
a memory including a program which, when executed, causes the processor to perform operations including projecting the grid pattern image and the subject image such that the grid pattern image is superimposed on the space such that the subject image is superimposed on a subject that is present in the space, wherein a part of the grid pattern image corresponding to a position of the subject image is highlighted.

2. The display device according to claim 1, wherein the subject is a pedestrian, and
a pedestrian image is projected such that the pedestrian image is superimposed on the pedestrian.

3. The display device according to claim 1, wherein the subject is a vehicle, and
a vehicle image is projected such that the vehicle image is superimposed on the vehicle.

4. The display device according to claim 1, wherein the grid pattern image has a plurality of vertical line images and a plurality of horizontal line images which intersect the plurality of vertical line images,
the subject image is positioned at an intersection point where a vertical line image included in the plurality of vertical line images and a horizontal line image included in the plurality of horizontal line images intersect, and
the vertical line image and the horizontal line image are highlighted.

5. The display device according to claim 1, wherein the grid pattern image has a plurality of areas which enclosed by a plurality of vertical line images and a plurality of horizontal line images which intersect the plurality of vertical line images,
the subject image is positioned at an area included in the plurality of areas, and the area is highlighted.

* * * * *